Figure 1:
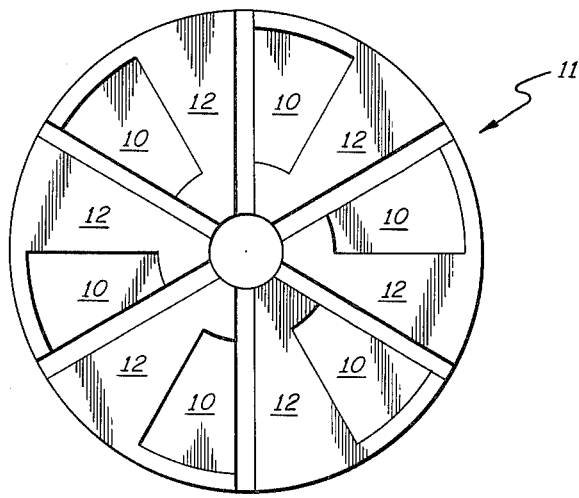

April 19, 1966     M. A. BLUMENFELD ETAL     3,247,080

METHOD OF MAKING WEAR-RESISTANT SURFACES

Filed May 31, 1962

INVENTORS
MARTIN A. BLUMENFELD
IGNATIUS A. D'ALESSANDRO
GEORGE L. JACOBS
BY
ATTORNEY

United States Patent Office
3,247,080
Patented Apr. 19, 1966

3,247,080
METHOD OF MAKING WEAR-RESISTANT SURFACES
Martin A. Blumenfeld, Somerville, N.J., and Ignatius A. D'Alessandro, Bethpage, and George L. Jacobs, Glen Cove, N.Y., assignors to Sperry Rand Corporation, Great Neck, N.Y., a corporation of Delaware
Filed May 31, 1962, Ser. No. 199,036
2 Claims. (Cl. 204—15)

The present invention relates to wear-resistant surfaces and methods of making the same.

The present invention provides, for example, gas lubricated bearings of the type used in gyroscopes and digital computer memory drums having extremely hard wear-resistant bearing surfaces. Gyroscopes and memory drums normally operate at very high rotational speeds and to reduce their rotating friction it is desirable to rotatably support them on an air film by means of air bearings. During starting and stopping operation of the gyroscopes and memory drums, the rotating portion of the air bearing rests upon the stationary portion of the air bearing thereby necessitating a bearing surface that is extremely wear-resistant in which the friction characteristics remain substantially constant over long periods of time in spite of numerous starting and stopping. Further, the bearing surfaces must resist galling, cracking, peeling, pulverizing, or flaking as well as corrosion and must also be capable of being finished to a uniform surface finish. The above requirements are necessary since during rotation of the air gap between the stationary and the rotating elements is only in the order of 150 millionths of an inch and a small particle or slight surface unevenness is sufficient to cause the air bearing to bind and fail at the high rotational speeds at which it operates. Bearing failures at these speeds is usually catastrophic.

Further, particularly for gyroscopes and memory drums, the bearing surface associated with the rotor is preferably comprised of the same material as the rotor in order to have a homogeneous rotating mass to prevent mass shift or distortions with variations in temperature which, for example, in gyroscopes results in an undesirable drift rate that produces an erroneous output signal.

Generally, the requirements for gas bearings further include extremely precise line definition of the load producing configurations, which is usually difficult due to the complex geometry of the load producing configurations, for example, step pads or spiral grooves in both thrust and journal bearings. Further requirements for the load producing configurations include a uniform depth controllable to .00002 inch as well as a film surface finish of the bearing surface in order of 10 to 20 millionths of an inch root mean square.

Mechanical methods of machining to achieve these requirements produce poor results because of the difficulty in obtaining good line definition particularly when sharp corners are desired. Further, they exhibit poor control of the depth of the load producing configurations and the surface finish is poor due in part to the inherent properties of the materials used previously for the bearing surface.

It is a primary object of the present invention to provide extremely hard wear-resistant surfaces having a coefficient of friction that remains substantially constant in use.

It is a further object of the present invention to provide a bearing having at least one bearing surface of low stress rhodium.

It is an additional object of the present invention to provide a method of obtaining wear-resistant surfaces for mating parts.

The above objects are achieved by the apparatus and process of the present invention which utilizes a low stress rhodium plating for the bearing surface of at least one of the mating bearing parts. The bearing surface of the other mating part of the bearing is a hard coating which, for example, when using an aluminum memory drum may be an aluminum oxide coating in order to maintain the rotor and bearing surface homogeneous.

Figure 2:
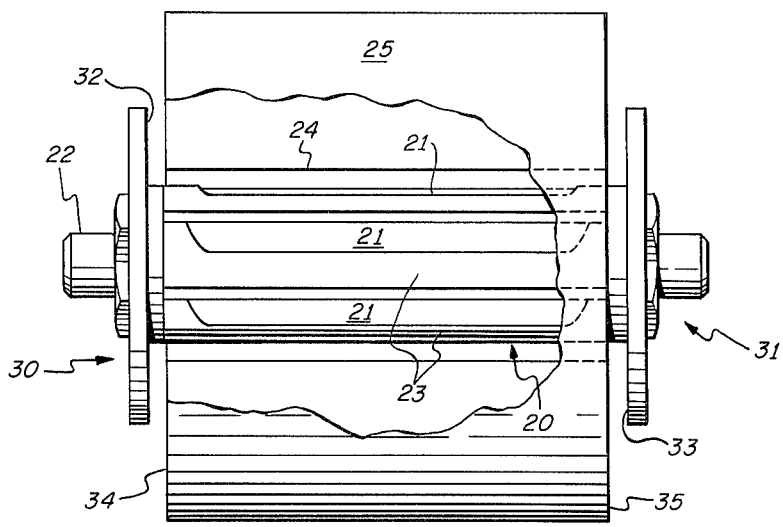

Referring to the drawings,

FIG. 1 shows load producing configurations of the step pad type on a thrust bearing, and FIG. 2 shows a digital computer memory drum mounted for rotation on an air lubricated journal bearing having load producing configurations thereon and utilizing thrust bearings of the type shown in FIG. 1.

The apparatus and process of the present invention will be described with respect to air bearings for digital computer memory drums for purposes of example. It will be appreciated that the present invention is equally applicable to provide wear-resistant surfaces for other applications, for example, cam surfaces.

As shown in FIG. 1, the load producing configurations 10 of a thrust bearing 11 are of the step pad type. The bearing 11 has a plurality of stationary bearing surfaces 12 which are cooperative with the mating bearing surface of a gyroscopic rotor or a memory drum.

As shown in FIG. 2, a journal bearing 20 includes a plurality of axially disposed load producing configurations 21 spaced around the circumference of a stationary shaft 22 of the journal bearing 20. The shaft 22 includes an external cylindrical surface 23 that is cooperative with the internal cylindrical bearing surface 24 of a rotating memory drum 25. Thrust bearings 30 and 31 of the type shown in FIG. 1 have their respective bearing surfaces 32, 33 cooperative with respective end portions 34, 35 of the memory drum 25.

In accordance with the present invention, a low stress rhodium plating has been found to provide the characteristics stated in the preamble for the bearing surfaces. A low stress rhodium plating is one which has a compressive stress rather than a tensile stress. Conventional rhodium plating produces a high tensile stress having relatively high porosity which increases proportionally with the thickness of the plate deposit. The use of a low stress rhodium plating actually reverses the inherent tendency toward highly tensile stressed deposits, thus, yielding a coating less subject to cracking, peeling or porosity at the thickness required. The low stress rhodium coating of the present invention will not crater nor pulverize under extremely abrasive conditions in contrast to conventional rhodium plating which may flake and cause damaging wear or catastrophic destruction in a short time. The unplated portion of the bearing surface defines the load producing configurations 10 shown in FIG. 1 and 21 shown in FIG. 2.

The method of the present invention includes the following steps when a low stress rhodium plating is applied to an aluminum bearing element.

A predetermined surface of the aluminum bearing element is copper plated to a suitable thickness, for example, .0008 inch by conventional cathodic copper plating methods using 24 amps/ft.$^2$ for two minutes and 12 amps/ft.$^2$ for an additional sixty minutes. A nickel plating is then applied over the copper plating to a suitable thickness, for example, .0025 inch by conventional cathodic nickel plating methods using 40 amps/ft.$^2$ for ninety minutes.

The nickel coating is then ground to the desired thickness, for example, .001 inch. The nickel coating is ultrasonically cleaned in trichloroethylene and then electrocleaned after which it is placed in a sulfuric acid dip for nickel for thirty seconds. The nickel oxide coating which forms on the nickel surface is then removed by pumicing the nickel plating by rubbing with cotton wetted with dilute 1% sulfuric acid solution and dipped in powdered lava. The pumice is removed by rinsing well with water and alcohol and allowed to dry after which a light-sensitive photo-resist is applied to the nickel surface and allowed to dry.

The photo-resist is exposed to ultraviolet light through a negative having the desired load producing configurations. The negative is preferably prepared from an enlarged drawing of the desired load producing configurations showing the relative locations thereof. The negative reduces the enlarged drawing to the actual bearing size for greater dimensional accuracy. The image is developed in trichloroethylene vapors which simultaneously dissolve the unexposed photo-resist.

All portions of the bearing element other than the bearing surface and the load producing configurations are masked by applying a stop off lacquer.

The exposed portion of the bearing surface not covered by the photo-resist is lightly pumiced to remove any nickel oxide and any photo-resist fragments by rubbing with cotton wetted with water and dipped in pumice. The bearing element is cleaned for about 10 minutes in a 6 oz./gal. Oakite 61 solution at 60° C. and then dipped in a 50% HCl solution in water for one minute. A nickel strike is then applied to the exposed bearing surface at 65 amp/ft.$^2$ for one minute by cathodic immersion in solution of nickel chloride 32.02/gal. and hydrochloric acid 100 cc./gal. at room temperature with nickel anodes. The purpose of the nickel strike is to provide better adhesion for the subsequent rhodium plating.

The exposed portion of the bearing surface not covered by the photo-resist is electroplated to provide a low stress rhodium plating of the desired thickness, for example, .0002 inch by cathodic immersion in a Rhodex concentrate of 1000 cc. which contains 5 gms. rhodium metal. The solution is maintained at 48° C. with a current density of 10 amps/ft.$^2$ for 45 minutes with rapid agitation. The replenisher provides .05 gm. rhodium metal per cc. of replenisher, e.g. 2 cc. is added per thrust pad and 4 cc. is added per thrust shaft. The low stress rhodium plating may be accomplished in accordance with the rhodium electroplating processes described in U.S. Patents 2,895,889 and 2,895,890, both of which are entitled "Low Stress Electrodeposited Rhodium" invented by Karl Schumpelt and issued July 21, 1959.

The exposed photo-resist is stripped or removed using trichloroethylene after which the stop off lacquer is stripped with acetone.

To provide an extremely smooth uniform bearing surface finish and a precise depth of the load producing configurations, the rhodium plated bearing surface is lapped to the desired pad depth, for example, by lapping to a depth of .00015 inch using a coarse grade compound followed by a final lapping using a fine grade compound to the desired flatness of 15 millionths.

The rhodium plating produced in accordance with the above-mentioned process is stress free or may even be made compressive to provide a fine grained and relatively pore free deposit having extreme hardness which provides a substantially constant coefficient of friction over long periods of time during starting and stopping conditions as required in bearing surfaces for gyroscopes and digital computer memory drums when utilizing gas bearings.

In gyroscopes and digital computer memory drums it is desirable that the rotor have its bearing surface integral therewith to produce a homogeneous mass that prevents mass shift with temperature variations as explained above. When utilizing an aluminum rotor, the combination of a low stress rhodium bearing surface on the stationary bearing element and a cooperative aluminum oxide bearing surface on the mating rotating element of the gas bearing has been found to provide a substantially constant friction with negligible variation for the coefficient of friction over long periods of operation as well as excellent wear-resistance. The aluminum oxide coating may be obtained by hard anodizing, flame spraying aluminum oxide or using parts of sintered aluminum oxide. In the case of hard anodizing, specifying a two and a half mil (.0025 inch) coating thickness on the aluminum surface of 61ST or 75ST alloy will yield a dimensional change of approximately half of .0025 or .0012 inch. A surface that provides the best wear characteristics is obtainable by grinding and lapping to a final thickness of .000050 to .0002 inch above the original precoated aluminum surface.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A process for making bearing surfaces having load producing configurations requiring precise line definition on an aluminum element including the steps of
    (1) plating copper on a predetermined surface of said aluminum element,
    (2) plating nickel on said copper,
    (3) grinding said nickel plating to the desired thickness,
    (4) pumicing said nickel plating,
    (5) applying a light-sensitive photo-resist to said nickel plating,
    (6) exposing the photo-resist to light through a negative to obtain the desired pattern,
    (7) removing that portion of the photo-resist which was not exposed to the light,
    (8) applying a nickel strike to the nickel plate which is not covered with exposed photo-resist,
    (9) plating low stress rhodium to a desired depth and with precise line definition on the nickel strike which is not covered with exposed photo-resist,
    (10) removing the exposed photo-resist,
    (11) and lapping said rhodium plating to obtain a uniform finish having a desired depth.

2. A process for plating bearing surfaces having load producing configurations requiring precise line definition on an aluminum element including the steps of
    (1) plating copper on a predetermined surface of said aluminum element,
    (2) plating nickel on said copper,
    (3) grinding and lapping said nickel plating to the desired thickness,
    (4) pumicing said nickel plating,
    (5) applying a light-sensitive photo-resist to said nickel plating,
    (6) exposing the photo-resist to light through a negative to obtain the desired pattern,
    (7) removing that portion of the photo-resist which was not exposed to the light,
    (8) masking all but said predetermined surface with stop off lacquer,
    (9) pumicing the exposed nickel plating lightly,
    (10) cleaning in 6 oz./gal. Oakite 61 solution at 60° C. for 5 minutes,
    (11) dipping in 50% HCl at 40° C. for 1 minute,
    (12) applying a nickel strike at 65 amp./ft.$^2$ for 1 minute to the nickel plate not covered with exposed photo-resist,
    (13) plating low stress rhodium to a desired depth and with precise line definition on the nickel strike,
    (14) stripping the exposed photo-resist,
    (15) stripping the stop off lacquer,
    (16) and lapping said rhodium plating to obtain a uniform finish having a desired depth.

References Cited by the Examiner

UNITED STATES PATENTS

| | | | |
|---|---|---|---|
| 2,367,314 | 1/1945 | Russell | 204—15 |
| 2,664,326 | 12/1953 | Kuzmick | 204—15 |

(Other references on following page)

UNITED STATES PATENTS

| | | | |
|---|---|---|---|
| 2,696,410 | 12/1954 | Topanelian | 308—9 |
| 2,699,424 | 1/1955 | Nieter | 204—15 |
| 2,702,252 | 2/1955 | Suchoff | 204—15 |
| 2,702,353 | 2/1955 | Herson et al. | 204—15 |
| 2,854,386 | 9/1958 | Lyman et al. | 204—15 |
| 2,895,890 | 7/1959 | Schumpelt | 204—47 |
| 2,959,525 | 11/1960 | Ritt et al. | 204—15 |
| 2,999,771 | 9/1961 | Gaynes | 204—15 |
| 3,013,845 | 12/1961 | Loch | 308—9 |

FOREIGN PATENTS 661,273   11/1951   Great Britain.

OTHER REFERENCES

Schumpelt (B), "Rhodium Plating and Its Application," Metal Cleaning and Finishing, March 1938, pages 197–200.

JOHN H. MACK, *Primary Examiner*.

FRANK SUSKO, *Examiner*.